Oct. 19, 1937.  G. A. ELLESTAD  2,096,611
CONFECTION
Filed Feb. 7, 1935  2 Sheets-Sheet 1
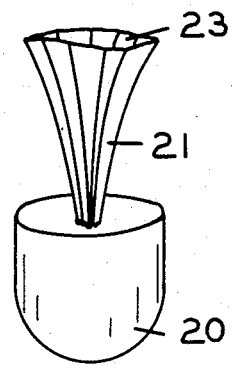
FIG.1
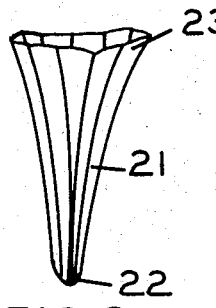
FIG.2
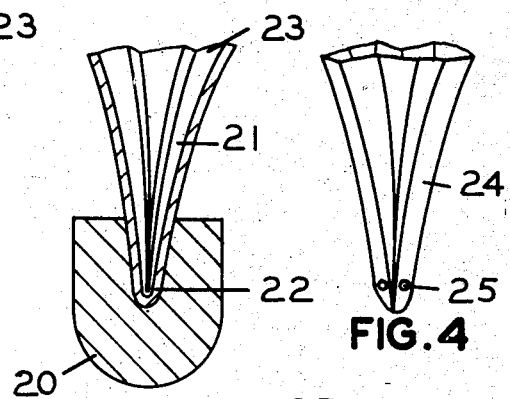
FIG.3  FIG.4
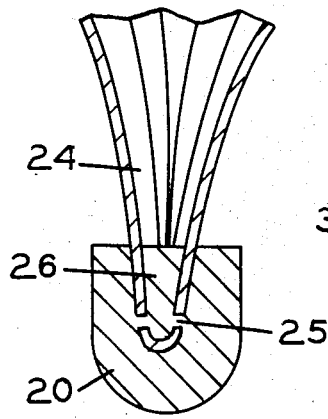
FIG.5
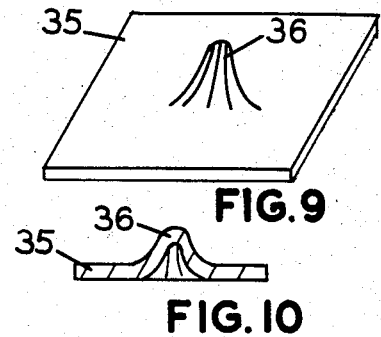
FIG.9
FIG.10
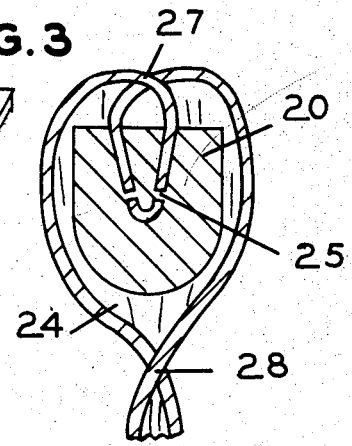
FIG.6
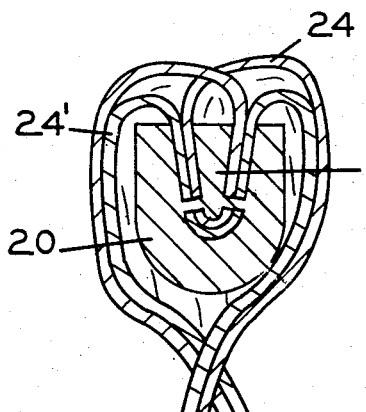
FIG.7
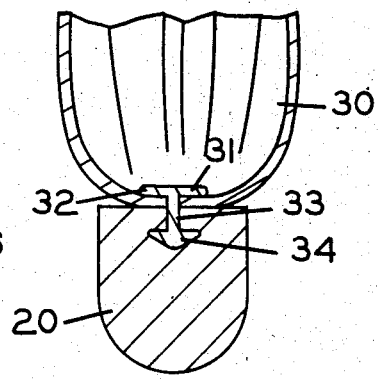
FIG.8
Gerhard A. Ellestad
INVENTOR
BY
ATTORNEY Oct. 19, 1937.  G. A. ELLESTAD  2,096,611
CONFECTION
Filed Feb. 7, 1935  2 Sheets-Sheet 2
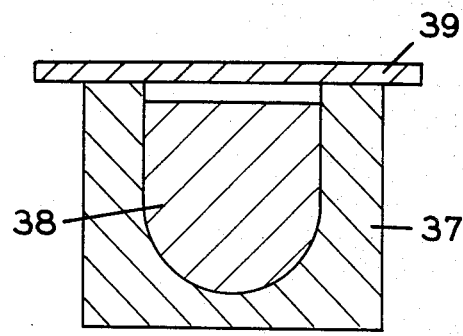
FIG. 11
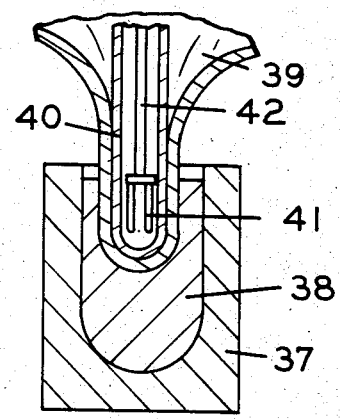
FIG. 12
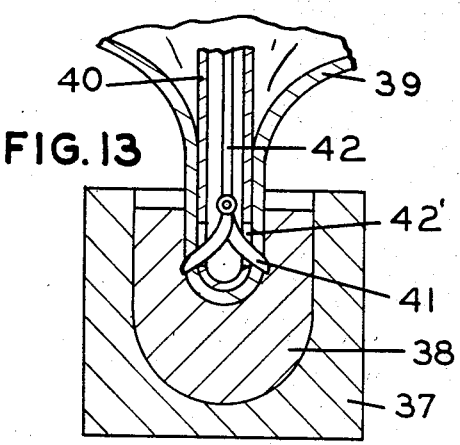
FIG. 13
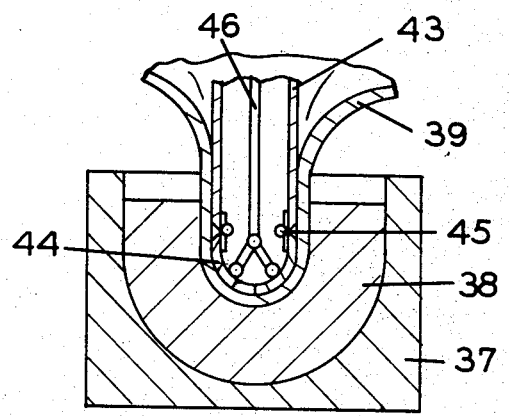
FIG. 14
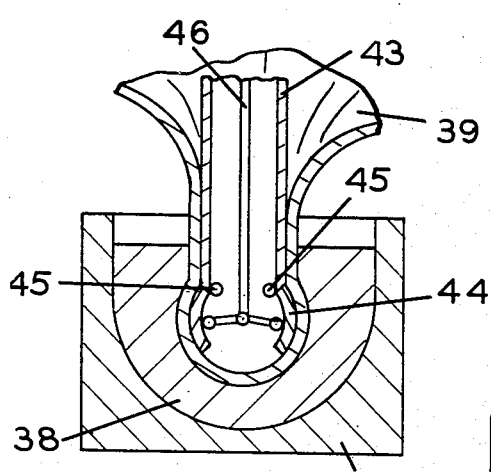
FIG. 15
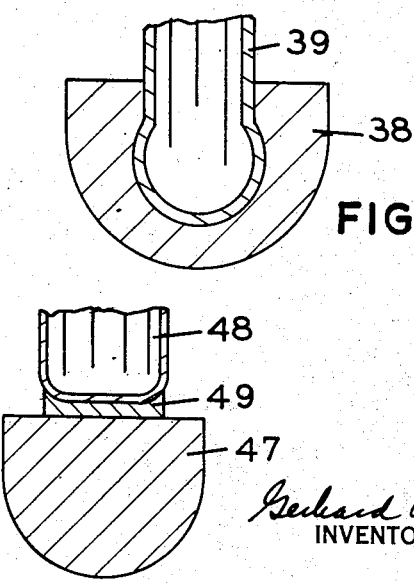
FIG. 16
FIG. 17
Gerhard A. Ellestad
INVENTOR
BY
ATTORNEY Patented Oct. 19, 1937

2,096,611

UNITED STATES PATENT OFFICE 2,096,611

CONFECTION

Gerhard A. Ellestad, Rochested, N. Y., assignor to Parker-Meyer-Dennis Company, Dubuque, Iowa, a corporation of Iowa Application February 7, 1935, Serial No. 5,444

13 Claims. (Cl. 99—138)

This invention relates to confections and methods and means for making same and more particularly it has reference to confections such as lollipops and frozen confections which comprise relatively solid edible portions which are supported by handle members during consumption.

In the generally prevailing practices of the prior art the supporting or handle members for confections of the type described are formed of relatively hard, rigid members such as sticks of wood. Such wooden sticks or handles are inserted in the lumps of candy material while the latter is in a relatively soft, plastic state so that when the candy material hardens the stick will be firmly embedded and adapted for use as a handle. In the case of frozen confections, the stick is inserted in the syrup or cream mixture so that upon subsequent freezing the embedded stick will serve as a handle. Such lollipops and frozen confections are consumed very largely by children so that the wooden stick handles are very apt to, and frequently do, cause serious bodily injury to children. Moreover, such handles do not always become firmly bonded to the confections and hence may become detached before the confection is entirely consumed.

One of the objects of my invention is to provide an improved confection with supporting handle and method and means for making same. Another object is to provide a confection having supporting means which will be safe and efficient in use yet relatively cheap and simple in structure. Still another object is to provide a confection of the type described having handle means formed of sheet material. A further object is to provide improved means and method for attaching sheet material handle members to confections of the type described. A still further object is to provide a confection of the type described having a sheet material member which may be used as an enclosing wrapper and supporting handle for the confection. Still another object is to provide a confection and method of making same having a plurality of superposed sheet material members which provide handle means and an enclosing wrapper for the confection. These and other objects and advantages reside in certain novel features of construction, arrangement and combination of parts and in the methods of constructing, arranging and combining same, all as will hereinafter be more fully described and pointed out in the appended claims.

Referring to the drawings:

Fig. 1 is a perspective view of a confection embodying my invention.

Fig. 2 is a perspective view of the sheet material handle member.

Fig. 3 is a vertical sectional view of the confection shown in Fig. 1.

Fig. 4 is a view of a modified handle member.

Fig. 5 is a vertical sectional view showing the modified handle member embedded in a confection.

Fig. 6 is a sectional view of the confection showing the sheet material member in use as an enclosing wrapper for the confection.

Fig. 7 is a similar view showing a plurality of sheet material members.

Fig. 8 is a sectional view showing a modified means for attaching the sheet material member to the confection.

Fig. 9 is a perspective view showing a modified sheet material member.

Fig. 10 is a vertical section thereof.

Fig. 11 is a sectional view of the sheet material member positioned over the confection mold.

Figs. 12 and 13 show successive steps in one method of attaching the sheet material member to the confection.

Figs. 14 and 15 show successive steps in another method of attaching the sheet material member to the confection.

Fig. 16 is a vertical sectional view of a modified type of confection and handle.

Fig. 17 is another view of a confection and modified means for attaching the sheet material handle member.

One embodiment of my invention is shown in the drawings wherein 20 indicates a relatively solid edible body comprising the confection. In the case of lollipops the body 20 is formed of relatively hard candy material while in the case of frozen confections the body 20 may be formed of a frozen or congealed syrup or cream mixture. Firmly embedded in the solid body 20 is the handle member 21 which is formed of a piece of flexible sheet material whose central portion forms the small closed end 22 and whose remaining portions extend upward and outward from the body 20 to provide the open, flared-out top 23. The closed end 22 of member 21 is placed down into the confection material, while the latter is in a relatively soft or liquid state and contained in a suitable mold, and held in position until the material becomes hard. The sheet material member 21 will thus be firmly embedded in the hardened confection body and the projecting portion of the member 21 will serve as a supporting handle for the confection during its consumption. Rigidity will be imparted to the projecting portion of the member 21 by longitudinal creases or folds or the projecting portion may be twisted so as to afford a relatively rigid handle member if the sheet material member is not stiff enough for the purpose. The liquid material of the confection will run into the folds and creases of the end 22 so that upon hardening the member 21 will be firmly anchored or bonded to the confection 20.

The sheet member 21 may be formed of any suitable material such as paper, cloth, metallic foil or the like. The material should, of course, be of such composition that it will not be deleteriously affected by the liquid confection. The sheet material should also be such that it will, when in use, provide a handle rigid enough to support the body of the confection in proper position for consumption. I have found that the cellulosic sheet materials sold under the tradenames "Kodapak" and "Cellophane" may be used successfully and that the sheet material made of crude rubber and sold under the trade name "Pliofilm" may also be used with good results. I do not, however, wish to limit my invention to the use of these materials as it is obvious that the invention can be practiced by the use of other sheet materials having the proper characteristics. The sheet material should be flexible and relatively tough so that it will not crack or fracture when used as an enclosing wrapper for the confection or when used in a creased or twisted form as a handle for the confection. Although such handles will be rigid enough to support confections they will not be as rigid and unyielding as the usual wooden handles that are generally used in lollipops and frozen confections so that my improved handles will not be apt to cause accidental bodily injury to the consumers, who are largely children.

In Fig. 4 I have shown a modified type of sheet material member 24 which is constructed the same as member 21 excepting for the holes 25 which are formed in the lower end of sheet material member 24. The apertured end of member 24 is placed down into the confection material, while the latter is in a liquid state and contained in a suitable mold, and held in position. Some of the liquid confection material will then run through the holes 25 and fill in the lower end of member 24 as clearly shown at 26 in Fig. 5. It will thus be apparent that when the confection material becomes hard, the sheet material member 24 will be firmly anchored within the body of the confection 20 since the portion 26, within the lower end of member 24, will be integral with the main body of the confection 20.

When the handle members 21 or 24 are firmly attached to the confection body 20 the latter may be wrapped with waxed paper or any other suitable protective wrapping material. Or, the handle member 24 could be twisted as at 27, adjacent the top of the confection body 20, and brought down around the latter and twisted together as at 28 and thereby form an enclosing wrapper for the confection as shown in Fig. 6. It is obvious, of course, that a similar procedure could be followed in the case of the confection which is provided with the handle member 21 of Fig. 3. In such case, the twist in the member adjacent the top of the confection body 20 might be omitted, since there is no confection material contained within the lower end of member 21 such as the portion 26 in the member 24.

If the handle member is also to serve as a wrapping enclosure for the confection, it might be necessary, with certain types of confection, to coat the outer surface of the confection with some suitable dusting powder or other substance so as to prevent the sheet material member from sticking to the confection or rendering sticky the surface of the member which is subsequently to be in contact with the hand when the member is turned back to serve as a handle. These disadvantages could also be avoided by superposing two sheet material members 24 and 24', anchoring them to the confection body 20, bringing the two members down around the body and twisting them together, as at 29, to form a double enclosing wrapper as shown in Fig. 7. With this arrangement, the outer member 24 does not contact with body 20, excepting of course where it is anchored at 26. Consequently, there is no chance for this member, which is to be turned back to serve as a handle for the confection, of becoming sticky and rendered undesirable as a handle. The inner member 24' can be formed of a relatively thin sheet material so that it can be readily torn away when the confection is to be consumed. In the case of frozen confections, the double wrapper arrangement of Fig. 7 may be effectively used by making the outer wrapper member 24 much longer than the inner wrapper 24'. The member 24 could then be turned back to serve as a handle and the shorter inner member 24' could also be turned back and extended in a flared-out position so as to serve as a guard to prevent drops of the melting confection from falling down on the hand which holds the confection by means of the longer handle member 24.

In Fig. 8 I have shown another modification wherein the sheet material handle member 30 is attached to the confection body 20 by means of a plug 31 which passes through an opening in the member 30 and is anchored in the body 20. The plug 31 may be formed of wood or any other suitable material and comprises a relatively broad head portion 32, connected by a stem 33 to an enlarged anchoring head 34. The plug 31 is passed through an opening in the sheet material member and the protruding end is then pushed into the confection body 20 preferably while the latter is in a plastic stage. The handle member 30 may, of course, be turned down to serve as a wrapper for the confection as shown in Fig. 6 or two sheets of material may be superposed, anchored to the confection body by the plug and treated as in Fig. 7.

In making the sheet material handle members such as shown in Figs. 3 and 5, the sheet material could be formed as shown in Figs. 2 and 4. Or, the sheet material 35, such as "Kodapak" which is thermo-plastic, could be provided with an integral, up-standing fluted, projection 36 as shown in Figs. 9 and 10. Another method is illustrated in Figs. 11–13 wherein 37 indicates a suitable mold which holds the liquid confection 38. The sheet material member 39 is placed above the mold in position so that a suitable plunger such as a round-nosed tube 40 may push the central portion of the sheet material member 39 down into the liquid confection as shown in Fig. 12. If it is desired to form apertures in the lower end of the member 39 the two cutters 41 may be actuated by rod 42 so as to pierce the sheet material member 39 through slots 42' in the tube 40 as shown in Fig. 13. When the cutters are withdrawn some of the liquid confection would flow into the apertures in member 39 to provide a handle member anchored to the confection as shown in Fig. 5.

Another modified means for making the confection is shown in Figs. 14 and 15 wherein the sheet material member 39 is pushed down into the liquid confection 38, held in mold 37, by a modified plunger 43 having a round-nosed end which has two portions 44 hinged at 45 and adapted to be moved outwardly by rod 46. The plunger 43, with its end closed, is pushed down into the relatively soft confection 38 as shown in Fig. 14. The rod 46 is then actuated to bring the portions in an outward position as shown in Fig. 15 and the portions are held in this position until the confection 38 becomes relatively hard. The portions 44 are then closed and the plunger 43 is withdrawn leaving the sheet material member 39 embedded in the hardened confection 38 as shown in Fig. 16. The enlarged lower end on member 39 aids in anchoring it to the confection and the upper portion of the member serves as a handle and wrapper as in the confections shown in Figs. 3 and 6.

A still further method of securing the sheet material member to the confection is shown in Fig. 17 wherein 47 indicates the relatively hard confection body to the top side of which the sheet material member 48 is secured by a suitable cementitious substance 49.

From the foregoing it will be apparent that I am able to attain the objects of my invention and provide an improved confection, having a handle member, and method and means of making same. The sheet material member provides a relatively simple yet efficient handle which may be firmly secured to the confection. Such a handle may be safely used, especially by children, without danger of accidental bodily injury such as is often caused by the wooden stick handles which are used in the confections of the prior art. My improved handle means is also firmly anchored to the confection so that the handle is not so apt to work loose as is frequently the case when the wooden stick handles of the prior art are used. Under the prior art practices the confections are usually enclosed by wrappers which frequently become unwrapped so as to fall off and expose the confections to contamination before they are sold for consumption. With my invention, however, the wrappers may be actually attached to the confection, as shown in Figs. 6 and 7, so that they cannot fall off the confection. In the form of my invention disclosed in Figs. 5 and 6 the small portion 26 of the confection, enclosed within the lower end of the sheet material member 24, should preferably be enclosed by twisting the member 24 at the top of the confection as at 27 whether the member 24 is to be used merely as a handle or as a handle and a wrapper. The sheet material used is generally available in various colors and is also usually adapted to carry printed matter or other ornamentation. Various modifications may obviously be made without departing from the spirit of my invention.

I claim:

1. As an article of manufacture, a confection comprising a relatively hard body of edible material, and a handle for said confection, said handle comprising a single, continuous sheet material member having its central portion secured to said body and another portion extending divergently and outwardly from the body, said member being flexible and of such properties that the other portion of said member will be rigid enough to serve as a handle for said confection.

2. An article of manufacture comprising a confection having a relatively solid body and handle means secured to said body, said means comprising a single flexible sheet material member which has its central portion only secured to said body and another portion extending outwardly from the body and adapted to be grasped by the hand.

3. An article of manufacture comprising a confection having a relatively solid body, a sheet material member having a portion embedded in and surrounded by the material of the body, said member having a twisted portion only at the surface of the body and extending outwardly and divergently from the twist to provide a handle.

4. A confection comprising a relatively hard edible member and a flexible sheet material element having a portion secured to said member, the other portion of said element being of such size as to be adapted to serve as an enclosing wrapper for said member and to serve as a handle for said member when brought together in extended relationship to the member.

5. A confection comprising a relatively solid body, a sheet material member having a central portion of its area secured to said body by a cementitious substance, the remaining portion of said member extending outwardly to provide a handle.

6. As an article of manufacture, a confection comprising a relatively hard body of edible material, a sheet material handle member and means for securing said member to said body, said means comprising an element having an enlarged head portion contacting with one face of said member and another portion extending from the other face of said member and embedded in and anchored to said body.

7. As an article of manufacture, a confection having a relatively solid body, a sheet material member having a pocket portion formed therein, said pocket portion being embedded in said body, said member having other portions projecting outwardly from said body to serve as a handle for the confection and adapted to serve as a wrapper for the confection when turned downwardly and around said body.

8. A confection comprising a relatively solid body, two superposed sheet material members having their central portions embedded in said body, the remaining portion of the inner member extending down around the body to provide a cover therefor, the remaining portion of the other member projecting outwardly to provide handle means for holding the confection during consumption.

9. A confection comprising a relatively solid edible body, a flexible sheet material handle member and means for attaching said member to said body, said means comprising an element having two enlarged head portions connected by a reduced stem, one of said head portions being in contact with said member, the other head portion being embedded in said body, said sheet material member being brought together to provide a handle for supporting said confection.

10. A confection comprising a relatively solid edible body and a flexible sheet material member having a portion embedded in said body, the other portions of said member being of such size as to be adapted to serve as an enclosing wrapper for the body and to serve as a handle for said body when brought together in extended relationship to the body.

11. A confection comprising a relatively solid edible body and a flexible sheet material member having a portion secured to said body by means of a cementitious substance, the remaining portions of said member being adapted to serve as an enclosing wrapper for said body and to serve as a supporting handle when in an extended relationship to the body.

12. A confection comprising a relatively solid edible body, a plurality of flexible sheet material members superposed at a place where they are secured to said body, the member adjacent to the body extending around the body to provide an enclosing wrapper therefor, the other member extending outwardly from the body to provide a handle therefor.

13. A confection comprising a relatively solid edible body and a sheet material member having a portion secured to said body, the remaining portions of said member serving as a handle and as an enclosing wrapper for said edible body.

GERHARD A. ELLESTAD.